United States Patent
Shavit et al.

(10) Patent No.: US 8,060,879 B2
(45) Date of Patent: Nov. 15, 2011

(54) PREDICTIVE LOG SYNCHRONIZATION

(75) Inventors: Nir N. Shavit, Cambridge, MA (US); Ori Shalev, Givaat-Shmuel (IL)

(73) Assignee: Oracle America, Inc., Redwood City, CA (US)

( * ) Notice: Subject to any disclaimer, the term of this patent is extended or adjusted under 35 U.S.C. 154(b) by 1569 days.

(21) Appl. No.: 11/442,870

(22) Filed: May 30, 2006

(65) Prior Publication Data

US 2008/0005112 A1    Jan. 3, 2008

(51) Int. Cl.
*G06F 9/46* (2006.01)

(52) U.S. Cl. ........................................................ 718/102

(58) Field of Classification Search .................... 718/102
See application file for complete search history.

(56) References Cited

U.S. PATENT DOCUMENTS

| | | | | |
|---|---|---|---|---|
| 5,852,731 A * | 12/1998 | Wang et al. | ................... | 718/100 |
| 2004/0015642 A1 | 1/2004 | Moir et al. | | |
| 2004/0215746 A1 * | 10/2004 | McCanne et al. | ............. | 709/219 |
| 2005/0065986 A1 * | 3/2005 | Bixby et al. | ................... | 707/204 |

OTHER PUBLICATIONS

Nir Shavit, et al., "Software Transactional Memory," 14th ACM Symposium on the Principles of Distributed Computing, 1995, 33 pages.
Tim Harris, et al. "Language Support for Lightweight Transactions," ACM, 2003, 14 pages.
Maurice Herlihy, et al., "Transactional Memory: Architectural Support for Lock-Free Data Structures," Proceedings of the 20th International Symposium in Computer Architecture, 1993, pp. 289-300.

* cited by examiner

*Primary Examiner* — Meng An
*Assistant Examiner* — Mengyao Zhe
(74) *Attorney, Agent, or Firm* — Robert C. Kowert; Meyertons, Hood, Kivlin, Kowert & Goetzel, P.C.

(57) ABSTRACT

A method for coordinating shared access to data objects comprises applying modification operations to a data object from a first thread of a plurality of threads on behalf of all the other threads during a session in which the first thread owns a lock on the data object. Each modification operation corresponds to a respective entry recorded in a log associated with the data object by a respective thread. The method may further comprise predicting, for a second thread, a result of a particular operation requested by the second thread on the data object. The result may be predicted using log entries corresponding to modification operations that have not yet been applied to the data object. In addition, the method includes performing one or more other operations in a non-blocking manner from the second thread during the session, where at least one other operation is dependent on the predicted result.

20 Claims, 8 Drawing Sheets

PREDICTIVE LOG SYNCHRONIZATION

BACKGROUND OF THE INVENTION

1. Field of the Invention

The present invention is directed to computer systems. More particularly, it is directed to coordination mechanisms for concurrent programming in computer systems.

2. Description of the Related Art

In the field of computer systems, considerable effort has been expended on developing techniques to support concurrent access to shared resources. Mutual exclusion locks and monitors represent two traditional concurrent programming synchronization mechanisms. Locks and monitors protect shared resources by separating access to them in time; for example, in one implementation, as long as a given thread of execution retains a lock on an object or resource, no other thread of execution may modify the object, and any other thread attempting to modify the object may be blocked from further execution until the lock is released.

However, designing efficient lock-based concurrent data structures has long been recognized as a difficult task better left to experts. Determining the optimal level of locking granularity for a given concurrently accessed data structure is not easy. Typical locking mechanisms either lock entire data structures (which helps to simplify programming), or implement locks of fine granularity to independently protect portions of complex data structures in an attempt to increase concurrency. However, fine-grained locking techniques often result in a substantial increase in programming complexity. In addition, many data structures that are typically protected by locks are often accessed for read-only operations (such as method calls that do not modify any field of the data structure). The reading operations could have been making progress concurrently if it were known that no writes on the data structure were performed during their execution.

The transactional memory programming paradigm has been gaining momentum as an approach of choice for replacing locks in concurrent programming. In transactional memory programming, sequences of concurrent operations may be combined into non-blocking atomic transactions, thus making parts of the code appear to be sequential without the heed to use locks. Executing threads indicate transaction boundaries, e.g., by specifying when a transaction starts and when it ends, but do not have to acquire locks on any objects. Transactional memory programming techniques may allow transactions that do not overlap in data accesses to run uninterrupted in parallel; transactions that do overlap may be aborted and retried. Transactional memory seems to promise a great reduction in the complexity of both programming and code verification, by making parts of the code appear to be sequential without the need to use locks. One stated goal of transactional memory programming techniques is to remove from the programmer the burden of understanding the interaction among concurrent operations that happen to overlap or modify the same locations in memory. However, transactional memory techniques also suffer from a variety of drawbacks. While transactions may simplify the programmer's need to reason about concurrency, programmers still have to decide which instructions to include in a transaction. This may leave the programmer with a tradeoff similar to that of locking techniques, between the size of the transactions used and program performance: a reduction of transaction size to enhance performance may lead to added complexity in code design and verification. In addition, many current implementations of transactional memory programming are known to be inefficient, for example because of the overhead of the specific mechanisms used to implement transactions and/or conflict detection. Explicit transactions may also introduce various programming language issues and complications such as how to support nesting of transactions, I/O during transactions, exceptions, etc., which may complicate transactional programming even if the transaction mechanisms were made more efficient.

SUMMARY

Various embodiments of methods and systems for coordinating shared access to data objects using predictive log synchronization are disclosed. According to one embodiment, a method comprises applying modification operations to a data object from a first thread of a plurality of threads on behalf of all the other threads during a session in which the first thread owns a lock on the data object. Each of the modification operations corresponds to a respective entry recorded in a log associated with the data object by a respective thread. The method may further comprise predicting, for a second thread of the plurality of threads, a result of a particular operation requested by the second thread on the data object. The result may be predicted using one or more entries in the log corresponding to modification operations that have not yet been applied to the data object. In addition, the method includes performing one or more other operations in a non-blocking manner from the second thread during the session, where at least one other operation is dependent on the predicted result. Thus, while the thread owning the lock executes a set of operations for which entries have been recorded in the log, other threads accessing the same data object may make progress without waiting for the lock to be released. Programmers may be required to provide only sequential code for performing various operations on shared data objects and for predicting results of operations represented by log entries in some embodiments, and may not have to generate or verify concurrent code; instead, the concurrent code may be generated automatically using the programmer-provided sequential code. Log entries may be recorded at a fairly high level, e.g., each log entry may correspond to a method call or a function call in a programming language such as Java™ or C++. The lock owner thread may apply modifications in the order in which the corresponding entries were added to the log.

In one embodiment, a plurality of versions of the data object may be maintained. During a given session in an embodiment in which two versions are maintained, the thread that holds the lock during the session may be configured to apply the logged modifications to one version (the "writable" version for the session), while the other version (the "read-only" version) may not be updatable during the session. Threads that do not own the lock may use the read-only version, together with one or more log entries, to determine the state of the data object and to predict the effects of their own operations.

After the lock-owning thread has applied a set of logged modifications, it may be configured to adjust the log (e.g., logically delete the entries it has applied) and release the lock to end the session in one embodiment. Another modifying thread may subsequently acquire the lock, and start a new session. In the new session, the roles of the writable and read-only versions of the previous session may be reversed: i.e., the version that was written may now be the read-only version, and the version that was read-only may now be writable. The new lock owner thread may apply logged modifications on behalf of other threads, as well as itself, to the currently writable version of the data object. In some embodiments, a version number may be used to identify which of the versions is currently writable. For example, the version number may be incremented once during a session, and a particular version may be identified as being writable if the version number is currently an even number, while the other version may be identified as being writable if the version number is currently an odd number. In one embodiment, e.g., at the start of a session, the lock owner thread may be configured to apply the latest set of modifications (i.e., the set of changes applied to the then-writable version during the immediately previous session) to the currently writable version to make the two versions consistent with one another In one embodiment, while a predicting thread is in the process of determining the state of the data object from what it considers to be the currently read-only version of the data object, it may be possible that a session is ended and the roles of the writable and read-only versions are reversed. Accordingly, in such an embodiment, the predicting thread may be configured to verify that a consistent read-only version was used for the state determination. The verification may, for example, include storing a current version number before determining the state and checking, after determining the state, that the version number remains unchanged. If the version number has changed, the predicting thread may be configured to repeat the process of determining the state until it successfully verifies that the version number remains unchanged during state determination.

Figure 1:
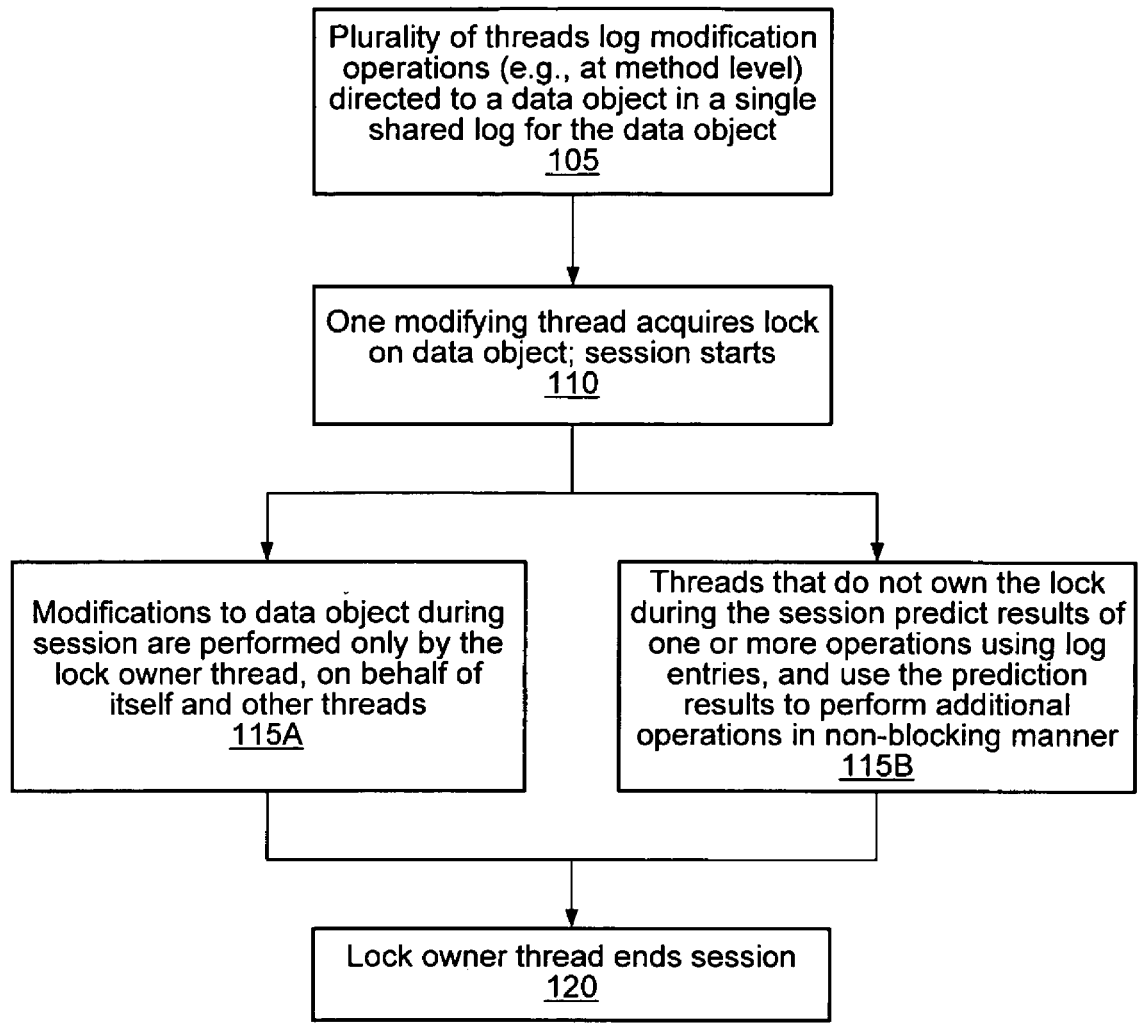
FIG. 1 is a flow diagram illustrating aspects of the operation of a mechanism to coordinate concurrent access from multiple threads to a shared data object, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a flow diagram illustrating aspects of the operation of a mechanism to coordinate concurrent access from multiple threads to a shared data object, according to one embodiment. Among the plurality of threads, some may be configured to modify the data object during a current high-level operation such as a method or function, and thus may be termed "modifying threads" with respect to the data object, while other threads may only read the data object, and thus may be termed "read-only" threads with respect to the data object. Each of the modifying threads may be configured to log its modification operations in a shared log maintained for the data object (block 105). The modification operations may be logged at a relatively high level in the depicted embodiment, e.g., each operation included in the log may represent an intended invocation by the corresponding thread of a method or a function expressed in a programming language such as Java™ or C++, where the method may itself comprise a number of lower-level operations such as address-level read, write and/or computation operations. Each of the modifying threads may attempt to acquire a lock that protects access to the data object. From among the modifying threads, one may acquire the lock on the data object (block 110). The period during which a thread holds the lock on the data object may be termed a "session" herein; thus, the acquisition of a lock by a thread may be said to initiate a session, and the release of the lock may be said to terminate the session. During a session, the thread that owns the lock (which may be referred to as the "lock owner" or the "lock owner thread" herein) may be configured to perform modifications on the data object on behalf of itself and on behalf of other threads that have logged modification operations in the log (block 115A). In one embodiment, the modifications may be applied on the data object in the same order in which the corresponding entries were logged.

Threads that do not acquire the lock (which may be termed "non-owners" or "non-owner threads" herein) may be configured to use entries in the log to predict or deduce the results of one or more of their own high-level operations, and use the predicted results to perform additional operations in a non-blocking manner (block 115B). In some embodiments, at least some of the additional operations may be dependent on a predicted result or results. Non-owner threads may also be termed "predicting" threads herein. The non-owner threads that use the log to anticipate or deduce the results of operations, e.g., before the operations are actually performed on the data object, may in some embodiments include both modifying threads and read-only threads. In some scenarios, read-only threads may access the log to determine the state of the data object, but may not need to process any of the entries of the log or predict the results of logged operations. A set of log-based state management functions for the data object, e.g., in the form of programmer-provided sequential code specific to the type of data object being accessed, may be used together with the log entries in determining the state of the data object and predicting the results of the operations of the non-owner threads in some embodiments. Further details and examples of the log-based state management functions used in various embodiments are provided below. After the lock owner thread has applied a set of logged modification operations (including its own logged modification) to the data object, the lock owner may release the lock and end the session (block 120 of FIG. 1). In addition, prior to releasing the lock, the lock owner may logically and/or physically delete the log entries that it has applied to the data object (e.g., by adjusting a pointer to the head of the log), thus effectively shortening the log.

After the lock is released, a new session may be started the next time a modifying thread acquires the lock, and the new lock owner may then be configured to perform logged modifications on behalf of itself and other threads during the new session, while other threads use the log to make non-blocking progress. Thus, using the technique illustrated in the embodiment shown in FIG. 1, even though the shared data object is protected by a lock, both modifying and non-modifying threads may concurrently be able to make non-blocking progress (i.e., without being required to wait until the lock is released) based on predicted results of the logged operations. It is noted that if the majority of operations performed on the data object are read-only operations, as is often expected to be the case for certain types of concurrently-accessed objects, relatively few modification operations may be logged, and therefore very little overhead may be required for the majority of concurrent accesses to the data object, especially compared to conventional locking schemes or transactional-memory implementations.

Figure 2:
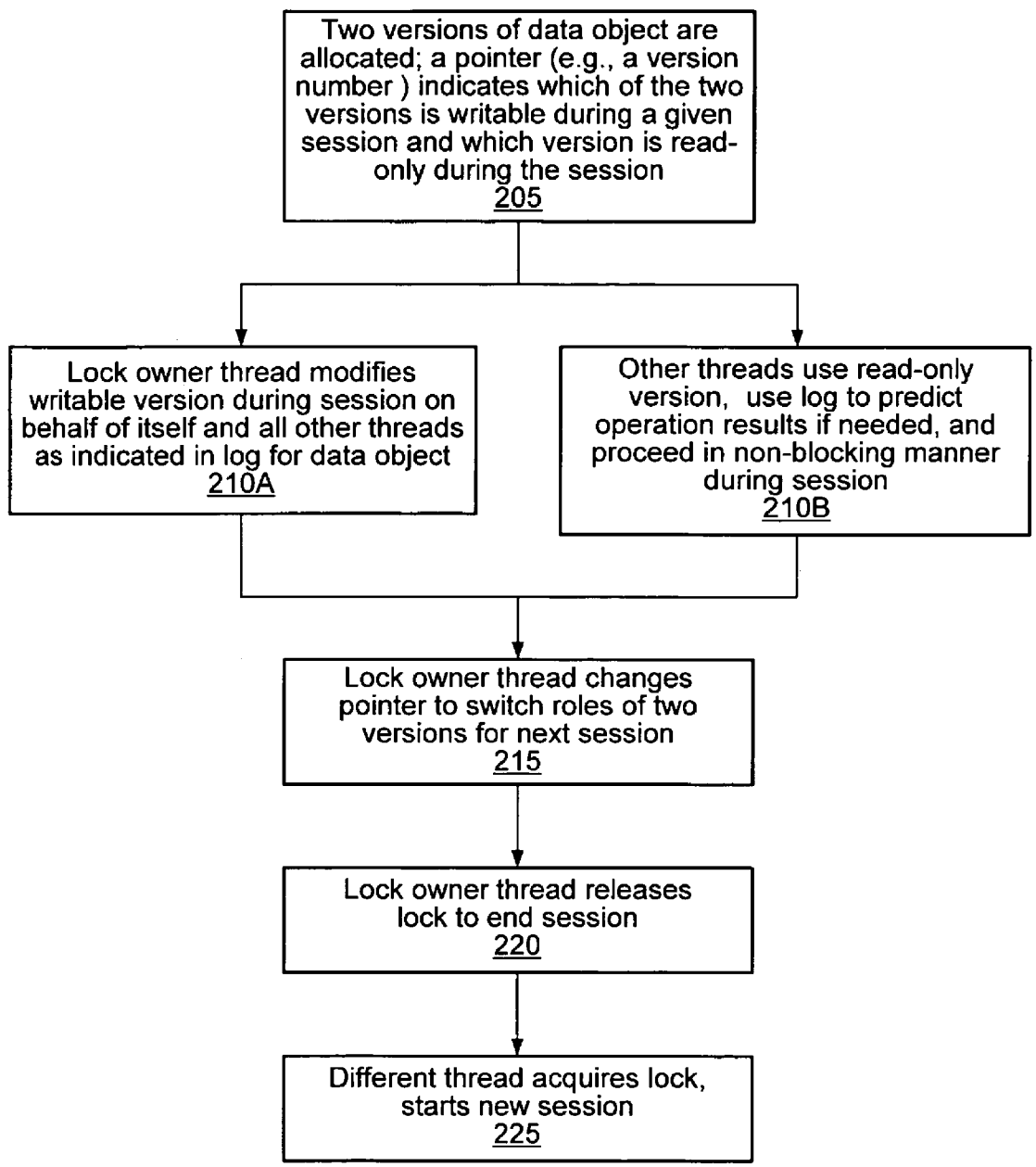
FIG. 2 illustrates aspects of the operations of a mechanism for concurrent access to a data object according to an embodiment in which a writable version and a read-only version of a shared data object are maintained.

In some embodiments, two or more copies or versions of a data object to be concurrently shared by a plurality of threads may be maintained, of which only one of the versions may be modified by the lock owner thread during a session. FIG. 2 illustrates operations of a mechanism for concurrent access to a data object according to one such embodiment, in which a writable version and a read-only version of the data object protected by a lock are maintained. As shown in block 205, two versions of the data object may be initially allocated, and a pointer or flag may be used to indicate which of the versions is writable during a current session, and which of the versions is read-only (not to be modified) during the session. In one implementation, for example, the pointer may be implemented simply as a version number (initialized, for example, to zero) that is incremented once per session. When the version number is even, this may indicate that a first of the two versions is the writable version, and when the version number is odd, this may indicate that the second of the two versions is the writable version. During a given session, the lock owner thread may be configured to modify the writable version on behalf of itself and other modifying threads, e.g., based on logged modification operations, as shown in block 210A. During the session, other, non-owner threads may concurrently access the read-only version without acquiring a lock. If necessary, a non-owner thread may predict the results of one or more high-level operations using the log to make progress, also without having to wait for or acquire the lock (block 210B). After applying logged modifications, the lock owner thread may be configured to modify the pointer to switch the roles of the read-only and writable versions for a subsequent session (block 215), and release the lock to end the session (block 220). A new session may be started when another modifying thread acquires the lock (block 225). The two versions may be made identical, e.g., by the lock owner thread, at the start of a session or at the end of a session in one embodiment. For example, a list of the changes made to the writable version during a given session may be maintained, and the list may be used to apply the same changes to the other version (i.e., the version that used to be the read-only version in the given session) at the start of the next session.

Figure 3:
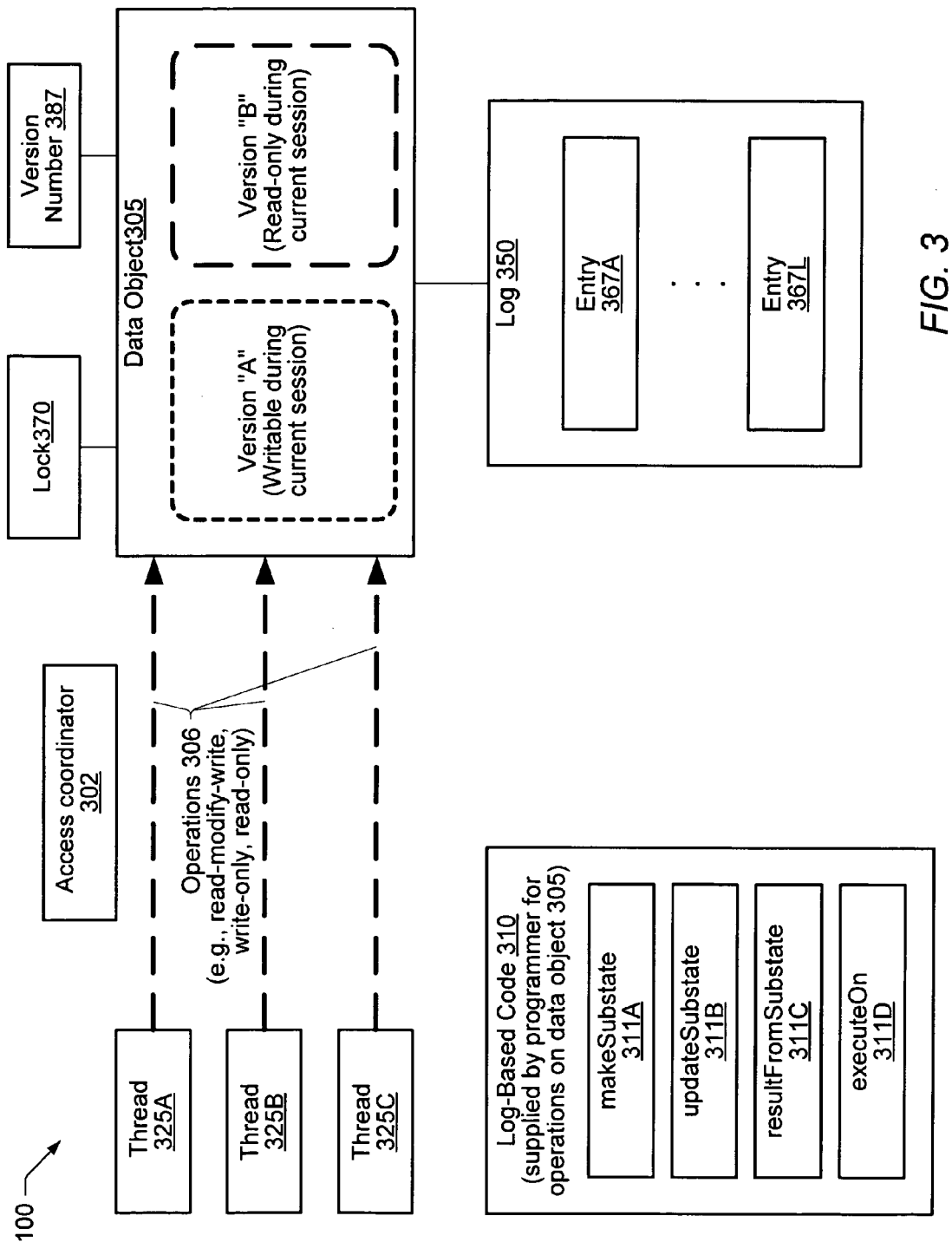
FIG. 3 is a block diagram illustrating one embodiment of a system.

FIG. 3 is a block diagram illustrating a system 100 in which coordination mechanisms illustrated in FIG. 1 or FIG. 2 may be implemented, according to one embodiment. The system comprises a plurality of threads of execution 325 (e.g., threads 325A, 325B and 325C) that are configured to perform operations 306 on a shared data object 305 with an associated log 350 and lock 370. In the depicted embodiment, the system includes an access coordinator 302 configured to implement the coordination mechanism, e.g., by providing support for concurrent log-based read and write operations as described below. Operations 306 may include read-only operations, write-only operations (which modify or mutate the data object 305 but do not return any result) and read-modify-write operations (which change the data object 305 and return a result dependent on reading the data object 305). The system may also include sequential log-based state management code 310 which may be provided by a programmer for selected operations on each type of shared data object 305 that is to be managed using the mechanism. For example, different code 310 may be provided for managing inserts into a tree-structured data object 305 than is provided for inserts into a data object representing an unordered set, or for inserts into a linked list object. Further details regarding the contents of various portions 311 (e.g., 311A-311D in FIG. 3) of the code 310 are provided below. In some embodiments, for a given program and set of programmer-provided code 310 for various operations, the access coordinator 302 may be configured to automatically generate concurrent code that guarantees sequential consistency, thus relieving the programmer from concurrency considerations. In such an embodiment, the access coordinator 302 may ensure that the result of a concurrent execution of the program is equivalent to that of some sequential ordering of all of the program's operations in which each thread's operations are executed in its own program order. It is noted that in some embodiments, memory consistency conditions weaker (or stronger) than sequential consistency may be supported. For example, in one embodiment, in order to achieve linearizability rather than sequential consistency, read-only operations may need to be ordered and thus may be logged as well.

Modification operations (e.g., specified at the method level) to the shared data object 305 may be coordinated using prediction operations that rely on contents of the log 350 (which may also be referred to as a "synchronization log") associated with the data object, as described below in further detail. Accordingly, the coordination mechanism may be termed a "predictive log synchronization (PLS)" mechanism herein. Each thread 325 that is to modify the data object 305 may be configured to store a respective entry for one or more modification operations (e.g., entries 367A-367L shown in FIG. 3) within log 350. For example, for a simple exemplary application managing access to a set of integers, a set of supported method-level modification operations may include delete(integer) and insert(integer), and each of the entries in the log 350 may correspond to a respective delete( ) or insert( ) method call, as described further in conjunction with the description of FIG. 4 below. In some implementations, when an entry is to be added to the log 350, an atomic primitive such as a "compare and swap" operation may be used to append the entry to the end of the log. In such an embodiment, while the data object 305 may be protected by a lock, the log 370 may not itself be lock-protected.

In one embodiment, after appending a modification operation entry 367 in the log 350, a modifying thread 325 may be configured to attempt to acquire the lock 370 for the data object 305, e.g., in order to actually apply the modification to the data object 305. The thread 325 that acquires lock 370 on the data object 305 may be configured to, in addition to performing its own operations on data object 305 during a session in which the thread holds the lock, perform pending modification operations corresponding to log entries 367 that have been entered by other modifying threads 325. Concurrently during the session, other threads 325 may use the log entries 367 and the programmer-provided code 310 to determine, in advance of actual modifications to the data object 305, the state that the data object 305 will be in after the logged modifications are applied, and use the results of the prediction to continue with their own operation without having to wait for the lock. Read-only threads 325 (i.e., threads that do not modify the data object 305 during a current high-level operation) may not even have to process the logged modifications and deduce their results in order to make progress in some embodiments; instead, a read-only thread may simply determine the state of the data object 305 using programmer-provided code 310, and proceed with its other operations. As described below in further detail, in one embodiment, if a thread 325 that is currently performing a read-only operation had previously logged a modification request for the data object and the requested modification is still pending, then the thread 325 may have to examine at least some of the log entries 367 and predict their effects.

It is noted that in some embodiments, the access coordinator 302 may be omitted; e.g., in one embodiment the PLS mechanism may be implemented within application programs and may require no special support other than that required for typical application programs. In some embodiments, a single lock 370 may protect a plurality of shared data objects 305, while in other embodiments, a plurality of locks 370 may be used to protect respective portions or components of a single data structure or shared data object 305. Similarly, in some embodiments, a single log 350 may be used for multiple shared data objects 305, while in other embodiments, multiple logs 350 may be used to log modification requests for a single shared data object 305.

The PLS mechanism may be configured to maintain two or more versions of shared data object 305 in one embodiment, as noted above, such as versions "A" and "B" in FIG. 3. At a given point in time, one version may be writable, while the other version or versions may be read-only. In FIG. 3, for example, version "A" is writable for the duration of a current session, while version "B" is read-only, and is accessed by non-owner threads in a non-blocking manner during the session. In the depicted embodiment, the version number 387 may serve as an indicator of which of the two versions is currently writable. The version number may be incremented once during a session by the lock owner thread; if the version number is even, this may serve as an indicator that version "A" is writable, while if the version number is odd, this may serve as an indicator that version "B" is writable. In other embodiments, other types of indicators, flags or pointers may be used to identify the currently writable version.

In some embodiments, each version may represent a copy of the entire data object 305, while in other embodiments, only portions of the data object 305 that are expected to be shared among multiple threads (e.g., portions or fields of the data object 305 identified by application programmers or compilers as shared or likely to be shared) may be included in each version. Unshared portions, or fields of the data object 305 that are not expected to be modified during a high-level operation, may not be duplicated in some embodiments.

In one embodiment, after acquiring lock 370, the lock owner thread may be configured to apply a latest set of changes (e.g., a set of changes, applied to the then-writable version during the immediately previous session) to the currently writable version to make the two versions consistent with one another. The process of making the two versions consistent (which may be termed "adjustment" or "version adjustment" herein) may be optimized in various ways (e.g., for space and/or for computation time) in some implementations. For example, if the data object 305 is tree-structured, a pointer from each node of the tree within version "B" may be stored to the corresponding node within version "A", thus allowing the lock owner thread to access the nodes that need to be updated in the newly-writable version without necessarily traversing the tree for each node. Adjustment may be optimized for space, for example, by not duplicating those data fields that are not accessed concurrently in some implementations. After version adjustment, the lock owner thread may apply the modifications corresponding to logged entries 367 (including modifications on its own behalf as well as on behalf of other modifying threads) to the writable version of the data object 305. In one embodiment, the lock owner thread may start applying modifications starting from a current "head" of the log, and apply modifications in the order in which the corresponding entries 367 appear in the log, until it has performed the modification that was logged by the lock owner thread itself. In some embodiments, the lock owner thread 325 may be configured to apply all pending logged modifications, e.g., before releasing the lock, the lock owner thread 325 may continue processing log entries 367 until no more entries remain. In other embodiments, for example to limit the time any given lock owner thread has to devote to operations of other threads, the lock owner thread 325 may be configured to spend no more than a specified amount of time performing modifications on behalf of other threads, or to perform no more than a specified number of operations on behalf of the other threads. After completing its processing of log entries 367, the lock owner thread 325 may be configured to increment the version number 387 to switch the roles of the writable and read-only versions for the next session, and release the lock to end the session. It is noted that in some embodiments where more than two versions of the data object 305 are maintained, the lock owner thread 325 may be configured to perform modification operations on more than one version during the session.

For many real-world applications where the ratio of high-level operations that modify shared data structures 305 to the high-level operations that merely read the shared data structures is high, the PLS mechanism may help to increase the throughput of the read-only operations substantially, and thereby increase overall application throughput as well. Furthermore, in many applications, several commonly used data structures for which high-level operations are seldom read-only (such as stacks, queues, heaps, linked lists, etc.) may often have inherent sequential bottlenecks. As a result, the level of concurrency that can be supported for modifying accesses to these commonly used data structures may be inherently limited, so delegating all modifications to a single thread at a time, as in the PLS mechanism, may still support desired levels of throughput for modifying threads. The PLS mechanism may avoid some of the overhead associated with typical software transactional-memory mechanisms, where for example each modifying thread must coordinate with an unknown subset of threads that dynamically overlap with it in memory. In addition, the PLS mechanism may be implemented without requiring programmers to explicitly demarcate transaction boundaries, thereby reducing programming complexity compared to typical transactional-memory mechanisms in some embodiments. Furthermore, since threads 325 may execute in a non-blocking manner in systems implementing PLS, the possibility of deadlocks is eliminated (as in the case of transactional-memory systems) and some of the effects of processor delays may be mitigated. It is noted that the PLS mechanism may be implemented together with some form of transactional-memory management mechanism in some embodiments; thus, PLS does not necessarily preclude the use of transactional-memory techniques.

PLS may in some embodiments significantly simplify concurrent programming and program verification by requiring programmers to write only specialized sequential code 310 from which concurrent code may be generated automatically, without requiring the programmers to manage concurrent accesses. A programmer may be required to design the state representation for the data object 305 and the methods that modify it, all of which may comprise standard sequential code. For example, to support PLS for an integer set data object 305, the programmer may provide sequential code for insert, delete and find operations. In addition, to support prediction, the programmer may be required to design the log application pattern, i.e., the way that operations need to be applied from the log to the state representation in order to compute the result of a given operation. The programmer may specify what data is to be extracted from the state representation, and how one operation in the log affects the results of other operations.

In the embodiment shown in FIG. 3, four exemplary programmer-specified portions 311 of programmer-supplied code 310 for a particular high-level operation are illustrated: generateSubstate 311A, updateSubstate 311B, resultFromSubstate 311C and executeOn 311D. In the depicted embodiment, each portion 311 of code 310 may represent a respective method or function (e.g., a method representing an implementation of an interface defined in a programming language such as Java™ or C++). It is noted that in other embodiments, each portion 311 may comprise a plurality of methods or functions, or two or more of the portions 311 may be implemented within a single method or function. In the following description, for ease of presentation, each of the portions 311 will be referred to as a respective method. Method makeSubstate 311A may be used to extract state information for data object 305 that may be needed to perform the particular high-level operation using the currently read-only version (version "B" in FIG. 3) of the data object. The extracted state information obtained via makeSubstate corresponding to a particular log entry 367 may be referred to as a "substate" herein. The updateSubstate method 311B may be used to apply the effect of a logged operation 367 on a specified substate; thus, consecutive invocations of updateSubstate for a sequence of log entries 367 may be used to determine the cumulative effects of the corresponding sequence of modification operations. Method resultFromSubstate 311C may be used for extracting the final result of the particular high-level operation on a substate, e.g., on the substate representing the accumulated effects of a plurality of log entries 367. Method executeOn 311D may represent a traditional sequential implementation of the particular high-level operation on a data object 305. Each of these exemplary methods 311 is explained in further detail below using a simple example of an integer set data object 305. It is noted that methods other than 311A-311D illustrated in FIG. 3 may be implemented in other embodiments.

It is noted that a given thread may be classified as "read-only" with respect to a data object 305 during one high-level operation, but may be classified as a "modifying" thread with respect to the same data object 305 during another high-level operation in some embodiments. Thus, the designation of a particular thread as being read-only or modifying with respect to a given data object may only be valid in the context of a single method or function in such embodiments. It is also noted that a thread that is designated as read-only with respect to a particular data object 305 during a high-level operation may modify one or more other objects, including other data objects, during the high-level operation (thus, the thread may not necessarily be "read-only" with respect to other objects).

Figure 4:
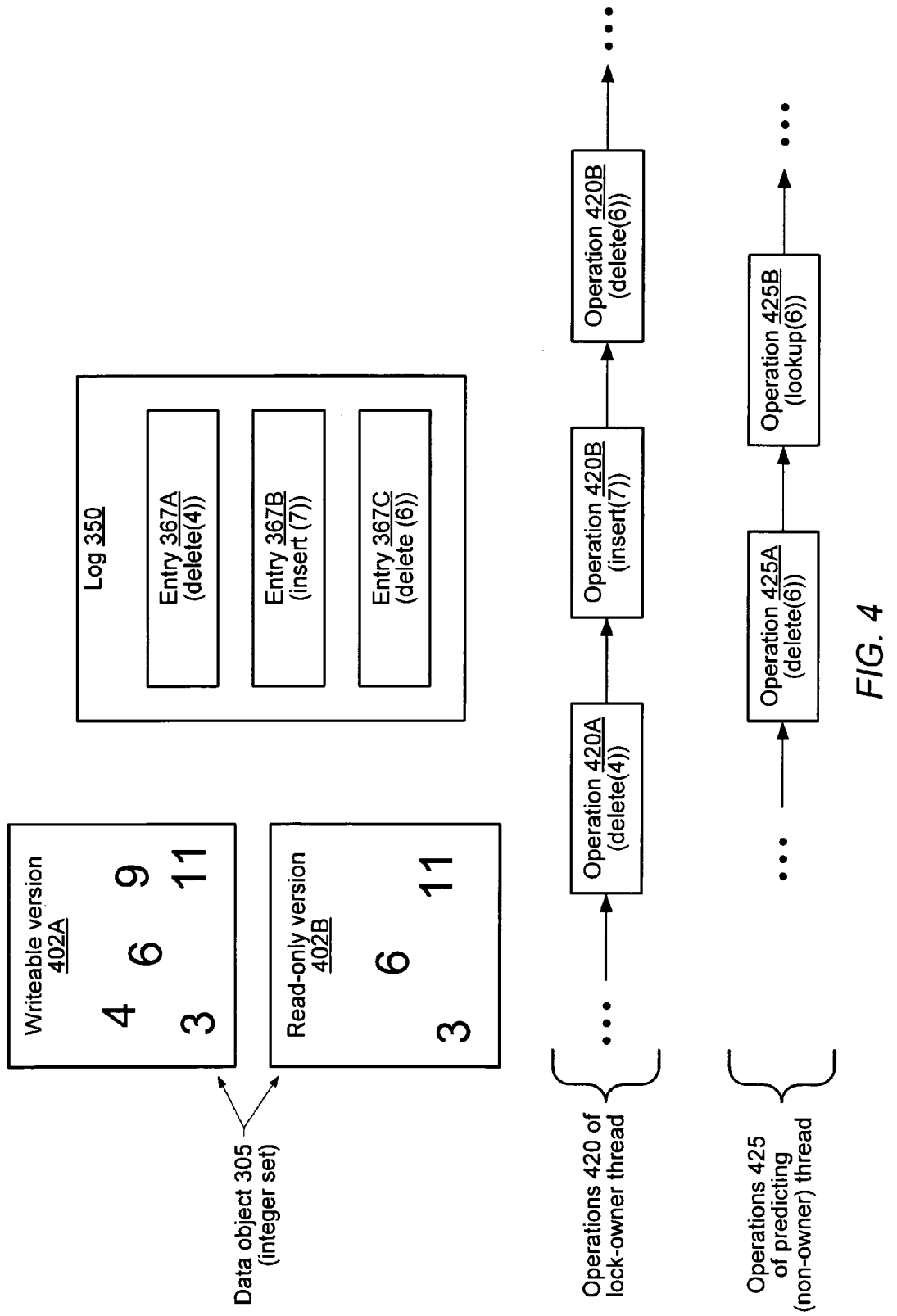
FIG. 4 illustrates an exemplary scenario in which predictive log synchronization is used to manage concurrent accessed to a data object that represents a set of integers, according to one embodiment.

FIG. 4 illustrates an exemplary scenario in which predictive log synchronization is used to manage concurrent accesses to a data object 305 that represents a set of integers, according to one embodiment. The integer set data object 305 may be configured to implement at least the following high-level operations: insert(integer), lookup(integer) and delete(integer). The insert and delete operations add and remove specified integers from the set, respectively. The insert operation returns a Boolean value true if the specified integer was not present in the set of integers, and was successfully inserted; otherwise, the insert operation returns the Boolean value false. The delete operation returns the Boolean value true if the specified integer was present in the set of integers and was successfully deleted; otherwise, the delete operation returns the Boolean value false. The (read-only) lookup operation returns the Boolean value true if the specified integer is present in the set and false if the specified integer is not present in the set. At the point of time illustrated in FIG. 4, the writable version 402A of the data object includes integers 4, 6, 9, 3 and 11, and the read-only version 402B includes integers 3, 6 and 11. The log 350 for the integer set includes three entries 367A-367C corresponding to respective high-level operations: delete(4), insert(7) and delete(6). Accordingly, the lock owner thread 325 for the data object is configured to perform the corresponding operations 420: operation 420A to delete the integer 4 from the set, operation 420B to insert the integer 7 into the set, and the operation 420C to delete the integer 6 from the set. The lock owner thread 325 may be configured to apply the operations 420 to the writable version 402A of the set in the illustrated order during the current session. A predicting thread (i.e., a non-owner thread) accesses the read-only version 402B to perform its own sequence of high-level operations 425 in a non-blocking manner, including operation 425A to delete the integer 6 (for which the predicting thread has added entry 367C to log 350) and operation 425B to determine whether the integer 6 is present in the set. It is noted that in order to preserve sequential consistency, the predicting thread may be required to anticipate the result of operation 425A in order to return the result false from lookup operation 425B. Thus, FIG. 4 provides an example where a thread that is performing a read-only operation (lookup(6)) may have to traverse the log 350 up to its last logged modifying operation and predict the result of each of the traversed log entries. Further details of the prediction process for the delete(6) operation 425A are provided below in conjunction with the description of FIG. 6.

In one implementation, for each log-based operation (such as insert(integer) or delete(integer)) to be supported for the data object 305, a programmer may be required to instantiate an object of a subclass of the Operation class illustrated in Pseudo-code Section A below. It is noted that while the various examples of pseudo-code provided herein (e.g. in Pseudo-code Sections A-F below) generally follow the syntax of the Java™ programming language, any desired programming language or combination of programming languages may be used to implement similar functionality in various embodiments. It is also noted that for clarity, the pseudo code examples provided herein may omit various details, such as constructors for some of the objects, initialization code and the like.

| Pseudo-code Section A: Operation class |
|---|
| 1  public abstract class Operation { <br> 2      Object result; <br> 3      boolean finished; <br> 4      AtomicReference<Operation>next; <br> 5   <br> 6      public abstract Object makeSubstate(Operation head, Object ds); <br> 7      public abstract void updateSubstate(Object substate); <br> 8      public abstract Object resultFromSubstate(Object substate); |

-continued

Pseudo-code Section A: Operation class

```
9      public abstract Object executeOn(Object ds);
10  }
```

As shown in lines 2-4 of Section A, the objects derived from the Operation abstract class may each comprise a field such as result for the result of the operation, a Boolean field such as finished to be signaled by the modifying thread when the work for the operation is completed, and a pointer such as next to the next operation in the log. The parameter head supplied to the makeSubstate method (line 6) may represent a pointer to the head of the log, and the parameter ds to make-Substate may represent the read-only version of the data object 305. Thus, in order to generate the substate, both the read-only version of the shared data object 305 and the log for the data object may be accessed.

To represent the substate generated during the prediction process for an insert operation on the integer set data object 305 of FIG. 4, a class similar to the IntSetState class shown in the following pseudo-code (Section B) may be implemented in one embodiment. The value field represents the integer to be inserted, and the is Found field may be used to indicate whether the integer to be inserted is already present in the set at the time insertion is attempted.

Pseudo-code Section B: Integer Substate class

```
1      class IntSetSubstate {
2          public int value;
3          public Boolean isFound;
4      }
```

A class similar to the InsertOperation class for which pseudo-code (Section C) is shown below may be used to implement concurrent insert operations on the integer set date object 305 of FIG. 4 in one embodiment.

Pseudo-code Section C: InsertOperation class

```
1   class InsertOperation extends Operation {
2       int parameter; // the value to be inserted
3
4       public Object executeOn(IntSet ds) {
5           this.result = ds.insert(parameter);
6           return this.result;
7       }
8
9       public Object makeSubstate(Operation head, IntSet ds) {
10          return new IntSetSubstate(parameter, ds.find(parameter));
11      }
12
13      public void updateSubstate(IntSetSubstate substate) {
14          if (parameter == substate.value) substate.isFound = true;
15      }
16
17      public Object resultFromSubstate(IntSetSubstate substate) {
18          return !substate.isFound;
19      }
20  }
```

In the InsertOperation pseudo-code above, the integer parameter indicates the value to be inserted into the integer set data object 305 of FIG. 4, and the functions insert( ) and find( ) represent sequential methods to respectively insert and find a specified integer in a set of integers. The executeOn method (lines 4-7 of Section C) simply calls the sequential implementation of insert on the data object represented by ds. The method makeSubstate (lines 9-11) instantiates a new substate containing the parameter to be inserted, determining whether the parameter is already present by calling the sequential find( ) method. The role of updateSubstate (lines 13-15) is to apply the effect of an insert operation on a given substate: if the integer value associated with the substate is equal to the integer to be inserted, the is Found field is set to true. The returnFromSubstate method (lines 17-19) returns the negation of is Found, as the insert operation is supposed to succeed if and only if the element to be inserted was not already found in the set. A discussion of the use of corresponding methods 311A-311D for deletion operations on integer set data objects 305 is provided below in conjunction with the description of FIG. 6.

When a data object 305 to be managed using PLS is created, in some embodiments two versions (one to be modified during a session, while the other provides non-blocking access to a read-only version of the object's data) may be allocated and initialized. In some implementations, the bulk of the PLS mechanism may be implemented using a Log class for which pseudo-code is provided below (Section D). Each version of the data object 305 may point to the same object of the class Log in such implementations.

Pseudo-code Section D: Log class

```
1   public class Log {
2       int version;
3       Object structures [2];
4       ReentrantLock mutex = new ReentrantLock( );
5       Operation headPointers[2];
6       ArrayList<Adjustment> adjustmentList;
7       ...
8       public Object readModifyWrite(Operation op) {
9           Object result;
10          appendToLog(op);
11          if (tryLock( )) {
12              result = mutate(op);
13              version += 1;
14              release( );
15              return result;
16          }
17          return predict(op, false);
18      }
19
20      public Object read(Operation op) {
21          return (predict(op,true));
22      }
23
24      public void write(Operation op) {
25          appendToLog(op);
26          if (tryLock( )) {
27              mutate(op);
28              version += 1;
29              release( );
30          }
31      }
32      ...
33  }
```

In the embodiment illustrated in Pseudo-code Section D, the Log class may implement a version number 387 simply as an integer version (declared on line 2 of Section D), respective pointers to each of the two versions of the data objects (declared as the structures array on line 3), and a mutex representing lock 370 (declared on line 4). In addition, the Log class may include two pointers (e.g., declared as the headPointers array on line 4) that are used to point to the head of the log—one pointer to be used by concurrent readers of the current read-only version, and the other to be used when the version is incremented at the end of a session. The two log head pointers may each be initialized to point to a dummy operation node when a Log object (i.e., an object of class Log) is instantiated. In addition, a Log object may include a list of adjustments (declared in line 6) that records changes to the writable version to be applied to the other version at the beginning of the next session in some embodiments.

After an operation is instantiated in a program, depending on the type of operation, one of the three methods readModifyWrite (lines 8-18 of Pseudo-code Section D), read (lines 20-22) or write (lines 24-31) may be invoked. The readModifyWrite method (which may be called when the operation modifying the data object 305 and also returns a value based on reading content of the data object 305) appends an entry 367 to the log (line 10), and tries to acquire the lock (line 11). If the lock is acquired, the readModifyWrite method invokes a mutate method (line 12) to modify the writable version of the data object 305 on its own behalf and on behalf of other modifying threads that have logged entries 367. Pseudo-code Section E provided below illustrates one implementation of the mutate method. After the mutate method completes, the version number may be incremented (line 13), the lock may be released (line 14), thus ending the session, and the result of the mutation returned (line 15) to the caller of readModifyWrite. If the attempt to acquire the lock fails, the readModifyWrite method may invoke a predict method, for which one implementation is illustrated below in Pseudo-code Section F. The write method (lines 24-31), called when data object 305 is to be modified but no return value is required, differs from the readModifyWrite method mainly in that (a) no value is returned to the caller and (b) if the attempt to acquire the lock fails, the write method simply returns, without calling the predict method. The read method simply calls the predict method (line 21).

Pseudo-code Section E illustrates an implementation of a mutate method that may be invoked from the readModifyWrite and/or write methods by a lock owner thread 325, according to one embodiment.

---
Pseudo-code Section E: Mutate method
---

```
1   private Object mutate(Operation op){
2       // assign ds to writable copy using version number
3       Object ds = structures [1 – (version %2)];
4       // apply adjustments from previous session
5       for (adj:adjustmentList) adj.adjust(ds);
6       adjustmentList.clear( );
7       // apply logged modifications
8       Operation prev = headPointers[(version%2)];
9       Operation e = prev.next.get( );
10      while (e != null) {
11          e.executeOn(ds);
12          e.finished = true;
13          prev = e;
14          e = e.next.get( );
15      }
16      // logically remove applied entries from log
17      headPointers[1 – (version %2)] = prev;
18      return op.result;
19  }
```

In the illustrated mutate method, the variable ds is first set to point to the writable version of the data object 305 (line 3 of Pseudo-code Section E). The computation (1−(version%2)) uses modulo arithmetic on the version field to determine which of the two versions is currently writable: e.g., if version is even, (version%2) is 0 and so structures[1] represents the writable version of the data structure 305, and if version is odd, (version%2) is 1, so structures[0] represents the writable version. Then, adjustments are made to the writable version (line 5) to reflect changes made to the other version during the previous session in accordance with the records in the adjustmentList array, and the adjustmentList array is cleared (logically emptied) (line 6). Next, the list of log entries 367 is traversed, starting at the current head of the log (the next element in the log after headPointers[(version%2)] (lines 8 and 9) and proceeding until no further elements remain (as checked in the while loop condition on line 10). For each entry in the log, the executeOn method is invoked (line 11) to perform the actions that correspond to a sequential execution of the mutating operation, and the finished field is set to indicate that the logged operation has completed (line 12). After all the entries 367 in the log have been processed, the pointer to the head of the log may be adjusted to point to the last-processed entry (line 17), thus in effect removing the processed entries from the log. The result of the operation (which may have been set in the executeOn method, see Pseudo-code Section C above for an example) may then be returned to the caller (line 18). It is noted that in some embodiments, the mutate method may include code to generate the adjustmentList for the next session, although such code is not shown in Pseudo-code Section E. In other embodiments, the code to generate the adjustmentList for the next session may be included elsewhere; for example, in one embodiment such code may be located within the executeOn method invoked from the mutate method.

Pseudo-code Section F illustrates an implementation of a predict method that may be invoked from the readModifyWrite and/or read methods described above to deduce the result of an operation by a non-owner thread, according to one embodiment.

---
Pseudo-code Section F: predict method
---

```
1   private Object predict(Operation op, Boolean isRead){
2       do {
3           oldver = this.version;
4           savedHead = headPointers[oldver %2].next.get( );
5           savedLastOpFinished = local.lastModifyingOp.finished;
6           substate = op.makeSubstate(savedHead, structures[oldver%2];
7           if (op.finished) return op.result;
8       } while (oldver != version);
9       if (isRead)
10          upto = (savedLastOpFinished || noSequentialConsistency) ?
              savedHead : local.lastModifyingOp;
11      else upto = op;
12      for (Operation e = savedHead; e != upto; e = e.next.get( ))
13          e = updateSubstate(substate);
14      return op.resultFromSubstate(substate);
15  }
```

The is Read input parameter to the predict method may indicate (if set to true) that the operation for which a result is to be predicted is a read operation; in contrast, if is Read is set to false, the operation is a readModifyWrite operation (write-only operations may not invoke a predict method as noted above). When executing the predict method in the illustrated embodiment, a thread 325 may have to complete determining the initial substate from the currently read-only version of the data object 305 before the session ends and the version number is incremented; otherwise, e.g., if the roles of the read-only version and the writable versions are switched before the predicting thread completes determining the initial substate, the predicting thread may have an inconsistent view of the data object 305 and may make incorrect predictions as a result. The do loop condition, checked on line 8 of Section F, ensures that if the version number changes while the predicting thread performs the operations of lines 3-7, the predicting thread retries the operations of lines 3-7 (unless the operation whose results are to be predicted has already been finished by the lock holder thread, as checked on line 7). Thus, when the do loop is eventually exited, the predicting thread may be guaranteed to have determined the initial substate (by calling makeSubstate on line 6) based on a consistent read-only version of the data object.

In the example of predicting thread operations 425 described in conjunction with the description of FIG. 4, to return a correct result for lookup operation 425B (which is a read operation) the predicting thread may have to consider its own previously logged delete operation 425A. Thus, if there are one or more modify operations that were previously logged by a predicting thread that is currently performing a read operation, the prediction may need to be performed up to the last such logged modify operation. The variable local.lastModifyingOp may be used to store an indication of the most recent logged modify operation of the predicting thread (pseudo-code for determining which specific logged operation is the most recent one is not shown in Section F), and the savedLastOpFinished Boolean variable may be used to indicate whether the most recently logged modify operation has been finished by the lock owner thread. In one implementation, local may represent a collection of thread-local values (such as local.lastModifyingOp), while savedLastOpFinished, substate (first used on line 6) and/or savedHead (first used on line 4) may be implemented as temporary local variables.

After the substate has been generated using the makeSubstate method call of line 6 using a consistent read-only version of the data object 305 (i.e., after the do loop of lines 2-8 is exited), the predicting thread may be configured to determine which of the logged modification entries (if any) are to be used to deduce the result of the current operation for which prediction is being performed. The variable upto is set to the entry immediately after the last log entry 367 that has to be considered in the prediction. If the current operation is a readModifyWrite operation (i.e., if isRead is false), then upto may be set to the log entry for the current operation (line 11). If the current operation is a read-only operation (as checked on line 9), however, several conditions may be checked in order to set the value of upto correctly. In some embodiments, for example, sequential consistency may not be a requirement, and a weaker memory consistency model may be sufficient. In such an embodiment, none of the logged entries 367 may need to be considered by the predicting thread: instead, the thread may simply use the substate obtained from the makeSubstate call on line 6 as a sufficient indicator of the data object's state. That is, upto may be set to savedHead (as shown in line 10), and as a result updateSubstate (otherwise called in lines 12-13 for each log entry to be considered) may not be called at all; thus, the predicting thread may not even need to inspect and apply modifications corresponding to log entries 367 on the initially generated substate. Similarly, if the current operation is read-only and the last modify operation of the predicting thread (if any existed) has already been performed by a lock holder, which would result in savedLastOpFinished being set to true, upto may also be set to savedHead, and no calls to updateSubstate may ensue. If, however, the last modifying operation logged by the predicting thread has not yet been performed by a lock holder, and sequential consistency is desired, then upto may be set to the last modifying operation (also shown in line 10), and one or more updateSubstate calls may be performed as part of the for loop in lines 12 and 13. Finally, after an appropriate number (which may be zero in the case of a reading thread under some circumstances) calls to updateSubstate have been performed, the resultFromSubstate method may be invoked and the return value returned to the caller (line 14).

It is noted that while the implementation of the prediction functionality described above may be derived from the semantics of the shared data object 305, the prediction function or method may be independent of the actual implementation of the shared data object 305. For example, the prediction methods on a list-based set and a tree-based set may use the same code in one embodiment. It is also noted that the various sections of pseudo-code (Sections A-F) shown above represent non-limiting example implementations of the PLS mechanism corresponding to one or more embodiments. In other embodiments, the PLS mechanism may be implemented using code that may have a different structure or organization than that illustrated in Sections A-F.

In various embodiments, any of a variety of extensions or variations of the basic PLS mechanism described above may be implemented. For example, in one embodiment, one or more predicting threads may still be in the process of reading a version "A" of data object 305 at the start of a session in which "A" is the writable version. In the basic PLS mechanism, the lock owner thread 325 may potentially modify the "A" version while a predicting thread is still reading the "A" version. Even though the predicting thread may eventually discover that it was reading the modifiable (and therefore potentially inconsistent) version (e.g., as a result of checking the do loop condition in line 8 of Pseudo-code Section F above), reading partially modified data may lead to errors such as memory access violations or infinite loops in the predicting thread. Accordingly, in some embodiments, the lock owner thread may be configured to wait until predicting threads that were reading the "A" version at the start of the session have finished reading the "A" version, before the lock owner thread modifies the "A" version. In one embodiment, each predicting thread may be configured to share its current status (e.g., whether it is currently reading a particular version of the data object 305) with the lock owner thread by attaching a locally updated record to a global linked list, which may be traversed by the lock owner thread at the start of a session. Aged elements may be removed from the global linked list (either by lock owner threads, by predicting threads, or by an other "cleaner" thread dedicated to maintaining the list) over time to ensure that the list size remains limited, e.g., proportional to the number of active threads. In another embodiment, the performance supported by the PLS mechanism for concurrent operations may be enhanced by explicitly controlling thread scheduling. For example, in scenarios where the number of active threads may exceed the number of processors available, access coordinator 302 may be configured to ensure that lock owner threads are not preempted in favor of non-owners, which may help increase overall operation throughput. In some embodiments, heuristic techniques may be used to decide whether a modifying thread should apply prediction or simply back off and retry when it fails to acquire the lock 370. In one embodiment, high-level operations that perform I/O or include other nested operations may be restricted to execute only if the lock 370 is held by the thread 325 performing the high-level operation, e.g., I/O operations may not be permitted from a non-owner thread.

Figure 5:
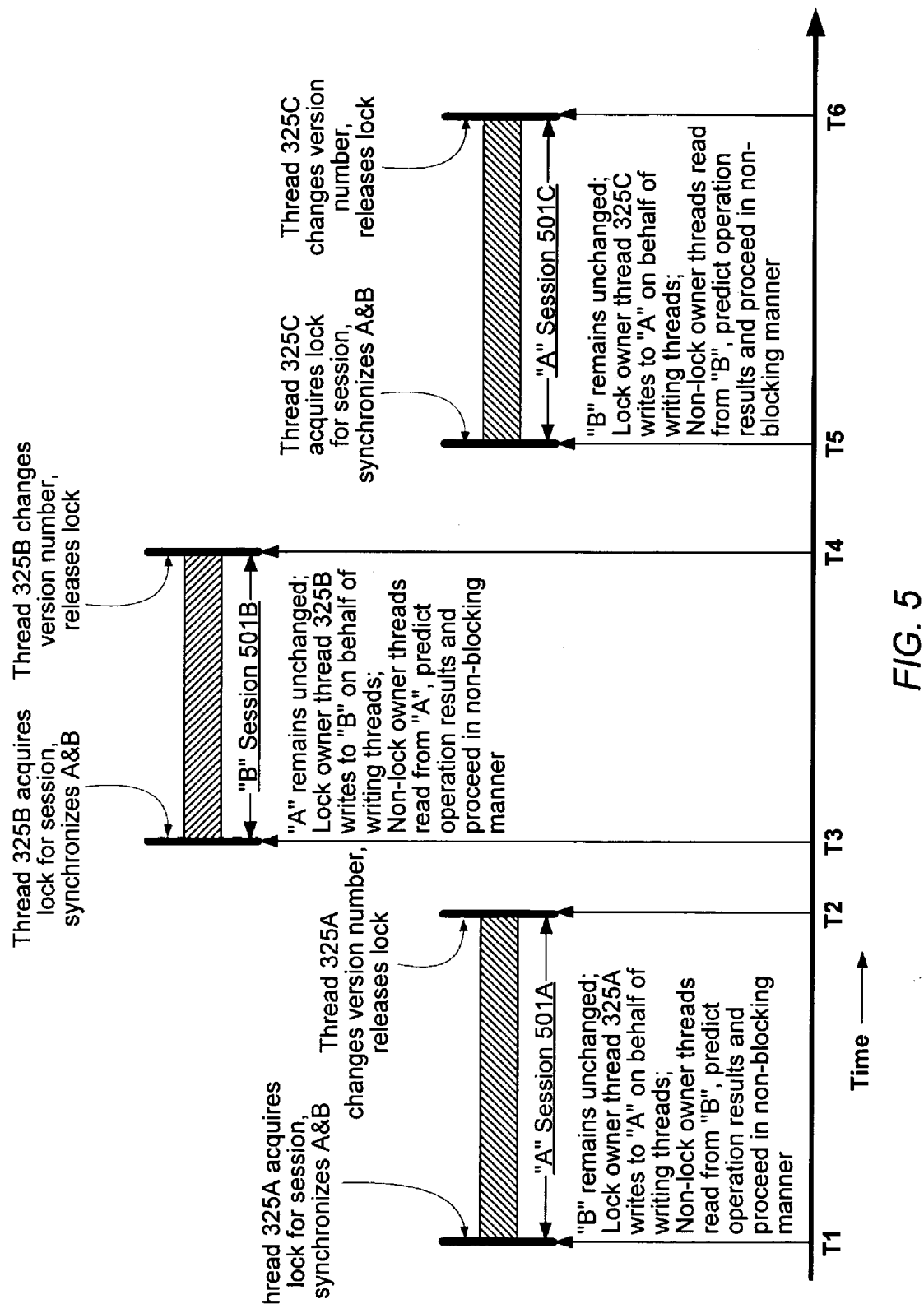
FIG. 5 illustrates a time sequence of sessions for a particular data object, according to one embodiment.

FIG. 5 illustrates a time sequence of sessions for a particular data object 305, according to one embodiment. In the illustrated embodiment, as in the embodiment of FIG. 3, two versions "A" and "B" of data object 305 are maintained. A session during which version "A" is writable may be termed an "A-Session" herein, and a session in which version "B" is writable may be termed a "B-Session". A-Sessions may alternate with B-Sessions over time: e.g., an A-Session may be followed by a B-Session, which may in turn be followed by an A-Session, and so on, as indicated in FIG. 5 and described in further detail below. During A-Session 501A, a lock owner thread 325A accesses and modifies version "A", while version "B" remains unmodified. During an A-Session, version "B" may represent a consistent state of the shared data object as of the point in time at which the immediately prior B-Session was completed. Readers of version "B" during an A-Session, such as non-owner threads 325B and 325C, thus may read a consistent version of the data object 305, and may apply logged modifications to deduce the results of various operations as described above and continue to make non-blocking progress on additional operations. As shown in FIG. 5, the A-Session 501A may be initiated at time T1 by a thread 325A acquiring lock 370. The lock owner thread 325A may be configured to synchronize versions "A" and "B", e.g., by applying adjustments to version "A" that were recorded during the immediately previous B-Session. (It is noted that while the operations of acquiring the lock and synchronizing versions are both shown as occurring at the same point in time T1 in FIG. 5 to avoid clutter, in practice some time may typically elapse between thread 325A acquiring the lock and the completion of the synchronization.) After versions "A" and "B" have been synchronized, in one embodiment lock owner thread 325A may perform a plurality of modification operations (e.g., starting from the head of the log upto and including its own logged modification) on version "A". In some embodiments, the lock owner thread may be configured to perform at most a specified number of modification operations on behalf of other threads, or to spend at most a specified amount of time on performing modifications on behalf of other threads before ending the session. The version number (or pointer to the current writable version) may be modified by the lock holder thread 325A at the end of the session.

While lock holder thread 325A performs its operations on version "A", during A-Session 501A, other, non-owner threads 325 may concurrently read version "B" in a non-blocking manner, deduce the results of logged operations as described above, and proceed to other operations. When the next modifying thread, e.g., 325B, successfully acquires the lock 370 (e.g., at time T3 in FIG. 5), it becomes the new lock owner and a B-Session 501B is initiated. The new lock owner 325B then performs similar operations to those performed by thread 325A in A-Session 501A, except that its modifications are directed to version "B", not version "A". For example, lock owner 325B synchronize "A" and "B" by applying modifications logged (for version "A") in the log 350 to version "B". Version "A" may remain unmodified during B-Session 501B, and non-owner threads may access version "A" during B-Session 501B. After it has performed logged modification operations including its own and those pending from other threads, lock owner 325B may be configured to change version number 387, release lock 370 and exit from its high-level operation, e.g., at time T4. The next time a modifying thread (e.g., 325C) acquires lock 370, the next A-Session may be initiated, e.g., at time T5. The cycle of A-Sessions followed by B-Sessions may continue as long as the application in which data object 305 is defined continues to be executed, and as long as modifying threads attempt to acquire lock 370 to access data object 305. It is noted that successive sessions may represent executions of different methods in some embodiments: e.g., A-Session 501A may represent one method, B-Session 501B may represent another method, and A-Session 501C may represent a third method. In other embodiments, two or more of the sessions may represent different invocations of the same method by the same thread or by different threads.

Figure 6:
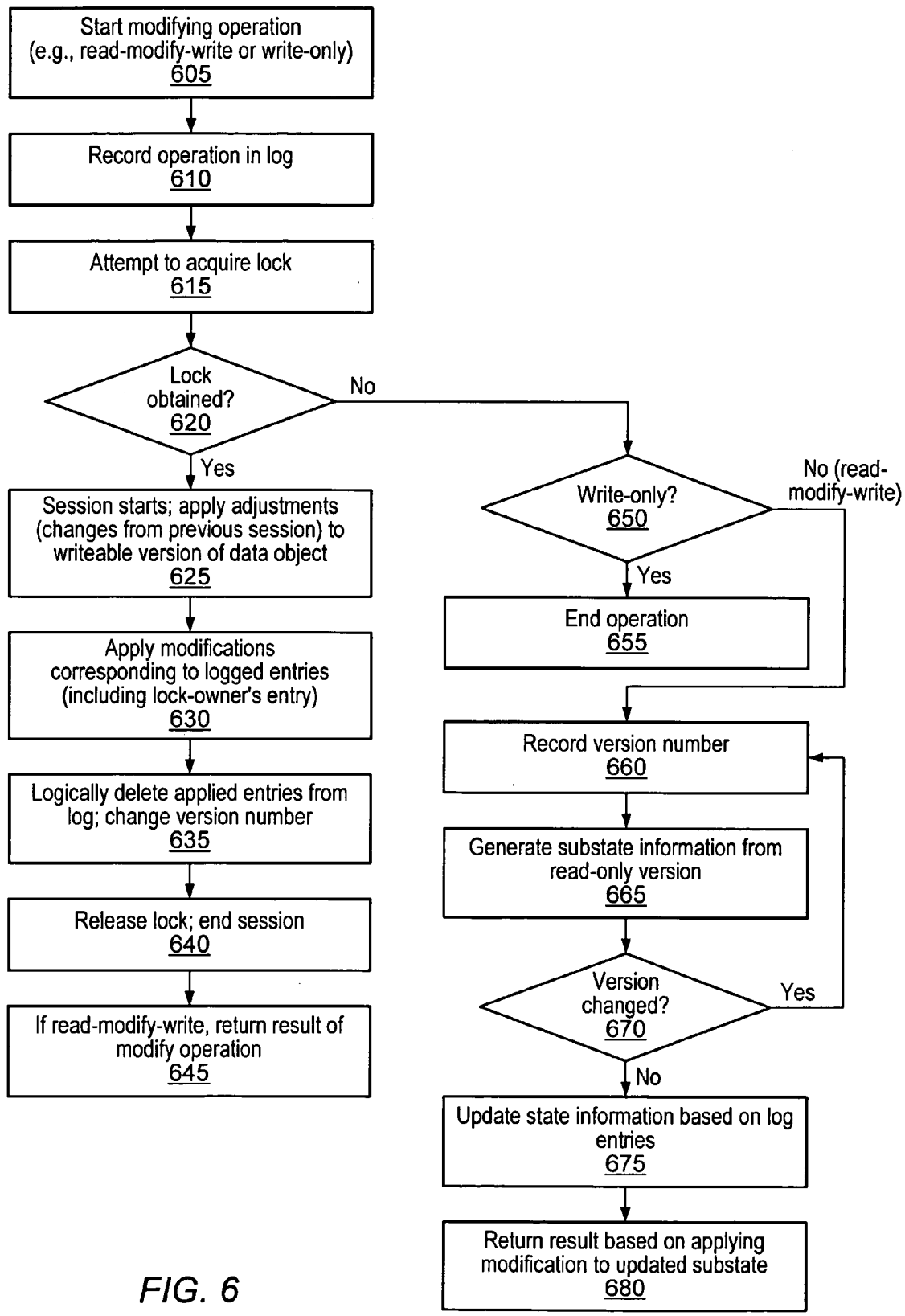
FIG. 6 is a flow diagram illustrating aspects of the operation of a modifying thread in a system in which predictive log synchronization techniques are implemented, according to one embodiment.

FIG. 6 is a flow diagram illustrating aspects of the operation of a modifying thread 325 (i.e., a thread performing either a read-modify-write operation or a write-only operation on a shared data object 305) in a system in which the PLS techniques described above are implemented and two versions of the data object 305 are maintained, according to one embodiment. The modifying thread 325 may be configured to initiate the modifying operation (block 605) and record an entry 367 corresponding to the modification operation in log 350 (block 610) for the targeted data object 305. As noted earlier, in one embodiment entries 367 may be appended to the log using atomic operations such as compare-and-swap (CAS) instructions. Access to the log 350 may not require the acquisition of a lock in some embodiments. After appending the entry 367, the modifying thread 325 may be configured to attempt to acquire the lock 370 on the data object 305 (block 615).

If the attempt to acquire the lock succeeds (as detected in block 620), the modifying thread 325 becomes the lock owner for a new session, and performs the operations corresponding to blocks 625, 630, 635, 640 and 645 during the session. As shown in block 625, the lock owner thread 325 may be configured to apply adjustments to the writable version of the data object, corresponding to changes applied to the other version during a previous session. The adjustment process may correspond to lines 4-5 of Pseudo-code Section E described earlier. Any of a number of optimizations may be implemented in various embodiments to make the adjustment process more efficient—for example, in embodiments where the data object 305 represents a hierarchical structure such as a tree that typically requires navigation or traversal through several levels to reach a given node, pointers to the nodes that are to be "adjusted" or modified may be kept during each session for the next session, so that at least some tree traversals may be avoided during adjustment processing.

After applying the adjustments, the lock owner thread 325 may be configured to examine the log 350 and apply modifications corresponding to logged entries 367 (on behalf of other modifying threads and itself) to the currently writable version of the data object 305 (block 630 of FIG. 6), e.g., performing the operations corresponding to lines 7-15 of Pseudo-code Section E. The modifications may be applied in the same order in which they were recorded in the log 350 in some embodiments. In one embodiment, the lock owner thread 325 may be configured to perform all the pending modifications recorded in the log; in another embodiment, the lock owner thread may be configured to perform all the pending modifications up to its own logged entry 367, but may release the lock after its own modification operation is completed. In some embodiments, e.g., in an attempt to ensure fairness among modifying threads, the total amount of work that is to be performed by a given modifying thread on behalf of other threads may be limited. In one such embodiment, a given lock owner thread may be configured to release the lock after performing a specified number of modification operations on behalf of other threads, allowing other threads to modifying threads to acquire the lock and share the burden of performing modifications.

After the modifications have been applied, the lock owner thread may logically delete the log entries 367 for the applied modifications, e.g., by adjusting a pointer to the head of the log (block 635 of FIG. 6 and line 17 of Pseudo-code Section E). In the depicted embodiment, a version number 387 may be used to indicate which of the two versions of the data object 305 is the currently writable one, and the lock owner thread 325 may be configured to update the version number (also indicated in block 635 of FIG. 6, and lines 13 and 28 of Pseudo-code Section D). The version number change may immediately switch the roles of the two versions of the data object 305, making the modifications appear to take place instantaneously in some embodiments. The lock may then be released (block 640 and lines 14 and 29 of Pseudo-code Section D) to end the session. If the modifying operation is a read-modify-write operation, i.e., if the caller requires a return value, the result of the operation may be returned to the caller (block 645, line 15 of Pseudo-code Section D); for write-only operations, return values may not be needed.

If the attempt to acquire the lock fails, and the modification operation being performed is a write-only one, (as detected in block 650 of FIG. 6), the modifying thread may simply return, since its modification operation has already been logged and thus will eventually be applied to data object 305, and since its caller does not require any return value. Otherwise, the operation is a read-modify-write operation for which a return value has to be provided to the caller, and the modifying thread may be configured to use the prediction functionality described above (e.g., in conjunction with the description of Pseudo-code Section F) to deduce the result of its operation. For example, to ensure that it derives substate information from a consistent read-only version of the data object 305, the modifying thread may save the current version number in a local variable (block 660, line 3 of Pseudo-code Section F) and generate the substate (e.g., using the equivalent of the makeSubstate method described above) from what it considers to be the current read-only version of the data object (block 665, line 6 of Pseudo-code Section F). If, after generating the substate, it finds that the version number has changed (as detected in block 670 of FIG. 6 or line 8 of Pseudo-code Section F), the modifying thread may be configured to repeat the process of generating the substate from the (new) read-only version, until it determines that the read-only version has not changed during the generation of the substate (blocks 660, 665, 670 and lines 2-8 of Pseudo-code Section F). After the substate has been successfully generated from a stable read-only version of the data object (as detected in block 670 if the version number has not changed), the modifying thread may then apply logged modifications to the substate (block 675, lines 12-13 of Pseudo-code Section F), and return the result of the operation to the caller (block 680, line 14 of Pseudo-code Section F and line 17 of Pseudo-code Section D).

In the example of the integer set data object 305 illustrated in FIG. 4, when predicting the result of the delete(6) operation 425A, the makeSubstate function may simply return a Boolean denoting whether the integer value 6 is in the readable version of the data object. The updateSubstate function may apply the results of other logged modification operations on the substate; for insert(6) operations, the substate may be set to true, and for other delete(6) operations, the substate may be set to false. After inspecting the log 350, the predicting thread may call resultFromSubstate on the updated substate. ResultFromsubstate may return true if the integer to be deleted was in the set as indicated by the updated substate, and false if the integer to be deleted was not in the set.

Figure 7:
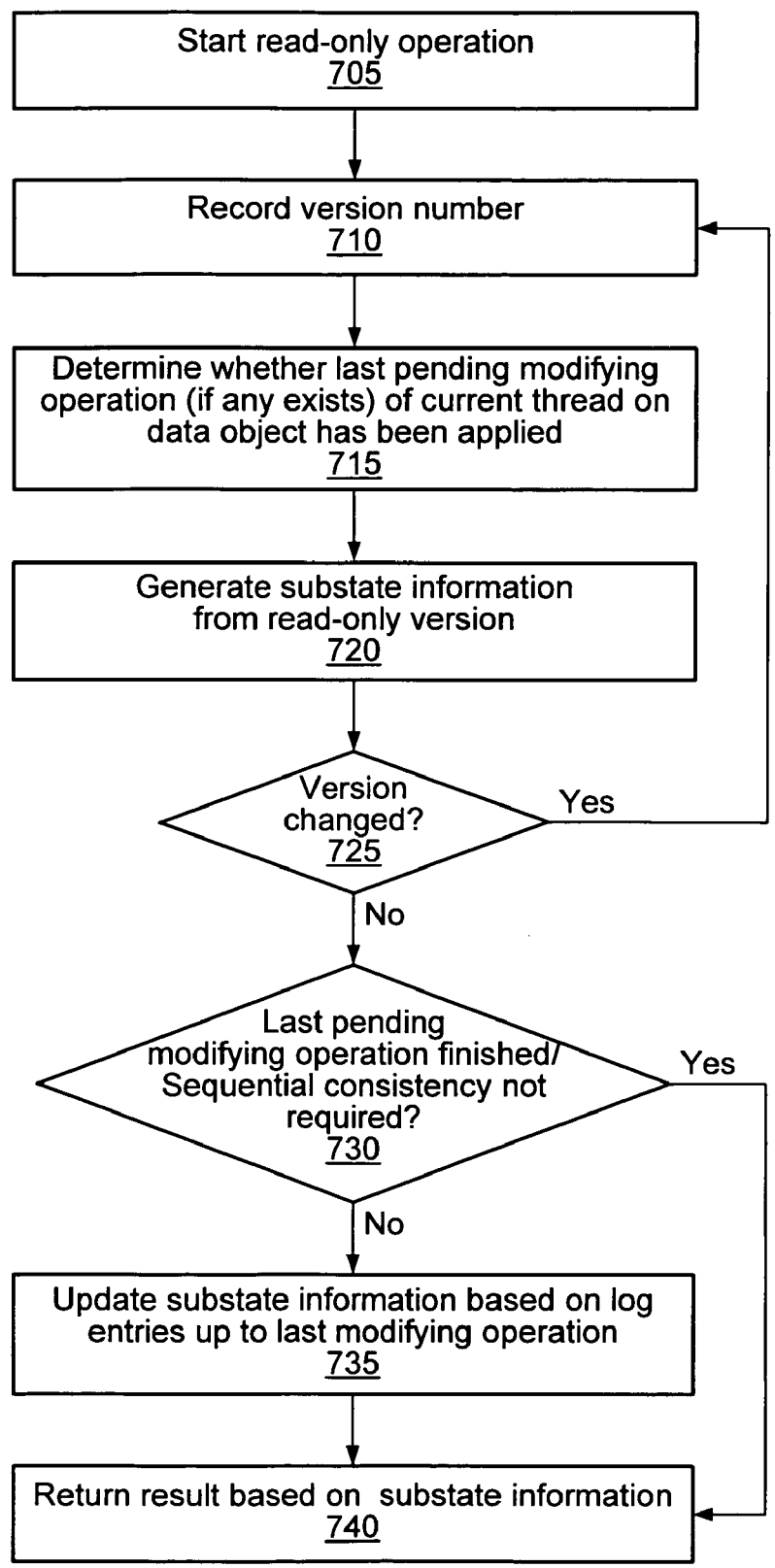
FIG. 7 is a flow diagram illustrating aspects of the operation of a thread performing a read-only operation in a system in which predictive log synchronization techniques are implemented, according to one embodiment.

FIG. 7 is a flow diagram illustrating aspects of the operation of a thread 325 during a read-only operation on a data object 305 in a system in which the PLS techniques described above are implemented and two versions of the data object 305 are maintained, according to one embodiment. Read-only operations may not have to be recorded in the log 350 for sequential consistency (although they may be recorded for higher levels of memory consistency such as serializability in some embodiments). However, as in the case of read-modify-write operations for non-owner threads, the makeSubstate and resultFromSubstate functions may still be invoked for read-only operations. In addition, to provide sequential consistency (as discussed above with respect to the delete(6) and lookup(6) operations 425 of FIG. 4), a reading thread may have to consider (e.g., with the help of updateSubstate) the effects of all of its own modifying operations logged before the current read-only operation.

After the read-only operation is initiated (block 705 of FIG. 7), the reading thread 325 may therefore be configured to invoke prediction functionality similar to that illustrated in Pseudo-code Section F. To ensure that it generates substate information from a consistent read-only version of the data object 305, the reading thread may save the version number (block 710, line 3 of Section F) and later, after generating the substate (e.g., using makeSubstate) on what the thread considers to be the current read-only version (block 720, line 6 of Section F), check that the version number has not changed (block 725, line 8 of Section F). In addition, the reading thread may be configured to determine whether its last pending modification operation (if any such operation exists) has been applied to the data object (e.g., using the savedLastOpFinished variable on line of Pseudo-code Section F) (block 715 of FIG. 7). If the version number has changed, the process of generating the substate (e.g., operations corresponding to blocks 710, 715, 720 and 725) may be repeated until the thread determines that the version number has remained stable during the generation of the substate.

After the substate has been generated from a stable read-only version (as detected in block 725 if the version number has not changed), the reading thread may be configured to take different actions based on a number of factors. If sequential consistency is not a requirement (as checked in block 730), the thread may simply return a result based on the generated substate (block 740) and proceed to perform additional operations (if any), since it has already read a version of the data object 305 from the read-only version and does not have to take its own pending modifications into account. If the reading thread had logged some modification operations earlier and all those modifications have already been applied (as also checked in block 730), so that the substate information generated in block 720 has already taken those operations into account, the thread may also simply return a result based on the generated substate and proceed to its next operation. If neither of the conditions checked in block 730 is true (e.g., if sequential consistency is required and if there are pending unapplied modification operations of the current thread in the log), then the thread may be configured to update its substate information (e.g., by invoking updateSubstate) based on one or more log entries 367. The substate may be updated for all the entries 367 from the start of the log, in sequence, up to the entry for the latest unapplied modification operation entry for the currently-reading thread (block 745 of FIG. 7, lines 9-13 of Section F). Finally, results based on the generated or updated substate information may be returned to the caller (block 740).

Figure 8:
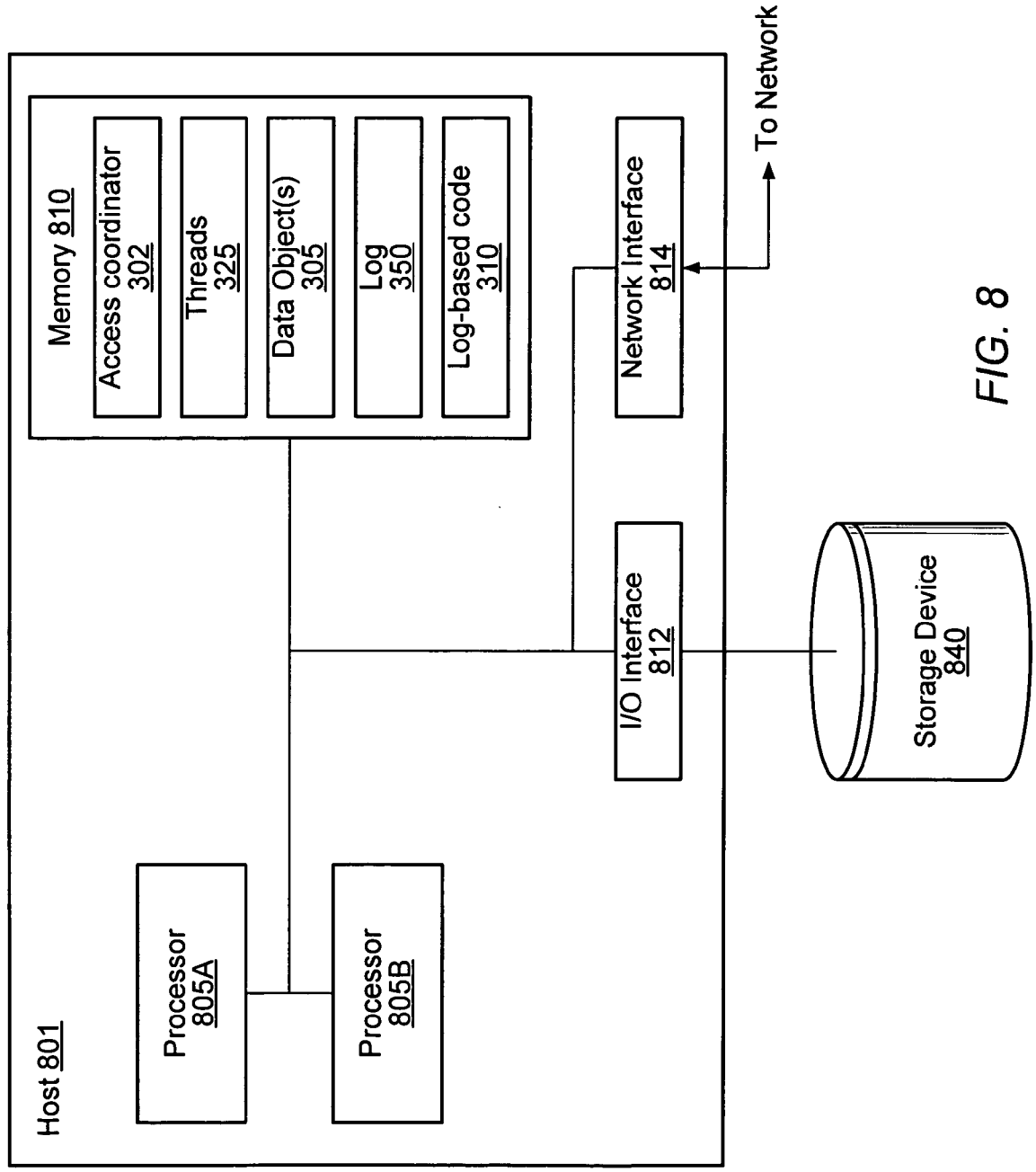
FIG. 8 is a block diagram illustrating a computer host, according to one embodiment.

FIG. 8 is a block diagram illustrating a computer host 801, according to one embodiment. Host 801 may comprise one or more processors 805 (e.g., 805A and 805B), which may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of threads 325, log-based code 310, and access coordinator 302 may be partly or fully resident within a memory 810 comprising data object (s) 305 and log(s) 350 at a given point in time. At least a portion of the instructions as well as data objects 305 and logs 350 may be stored within storage device 840 at various points of time in some embodiment. In some embodiments, the instructions and the corresponding data objects and logs may be included within a virtual machine process (such as a Java™ virtual machine (JVM)) in memory 810 at which threads 325 are executed. In various embodiments, threads 325 may implement any type of individual or standalone application (e.g., a database application or a scientific simulation application), an instance or component of a distributed application, etc. Memory 810 may be implemented using any appropriate medium such as any of various types of RAM (e.g., DRAM, SDRAM, RDRAM, SRAM, etc.). In addition to processors 805 and memory 810, host 801 may also include one or more I/O interfaces 812 providing access to storage devices, one or more network interfaces 814 providing access to a network and the like. Any of a variety of storage devices may be used to store the instructions as well as data for a PLS implementation in different embodiments, include any desired type of persistent and/or volatile storage devices, such as individual disks, disk arrays, optical devices such as CD-ROMs, CD-RW drives, DVD-ROMs, DVD-RW drives, flash memory devices, holographic storage devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for sharing access to a data object by a plurality of threads, comprising:
    applying modification operations to the data object from a first thread of the plurality of threads on behalf of all other threads of the plurality of threads during a session in which the first thread owns a lock on the data object, wherein each of the modification operations corresponds to a respective entry recorded in a log by a respective thread of the plurality of threads;
    predicting, for a second thread of the plurality of threads, a result of a particular operation requested by the second thread on the data object, wherein said predicting comprises using one or more entries in the log corresponding to one or more of the modification operations that have not yet been applied to the data object; and
    performing one or more other operations in a non-blocking manner from the second thread during the session, wherein at least one other operation of the one or more other operations is dependent on the predicted result of the particular operation.

2. The method as recited in claim 1, wherein the particular operation includes a read operation.

3. The method as recited in claim 1, wherein the particular operation includes a modification operation.

4. The method as recited in claim 1, wherein each entry recorded in the log corresponds to one or more operations of a method expressed in a programming language.

5. The method as recited in claim 1, further comprising:
    applying the one or more modification operations to a first version of the data object during the session, wherein said applying is performed from the first thread; and
    wherein said predicting comprises reading a second version of the data object from the second thread, wherein the second version is not modified during the session.

6. The method as recited in claim 5, further comprising:
    releasing the lock on the data object from the first thread to end the session;
    acquiring the lock on the data object from a different thread of the plurality of threads to initiate a new session; and
    applying a modification operation from the different thread to the second version of the data object during the new session;
    wherein the first version of the data object is not modified during the new session.

7. The method as recited in claim 6, further comprising:
    incrementing a version number associated with the data object from the first thread prior to releasing the lock.

8. The method as recited in claim 7, wherein said predicting comprises:
    (a) recording the version number from the second thread;
    (b) extracting state information for the data object at the second thread using the second version of the data object after recording the version number;
    (c) determining, from the second thread after extracting the state information, whether the version number has changed since the version number was last recorded; and
    if the version number has changed, repeating (a), (b) and (c) from the second thread until a result of said determining indicates that the version number has not changed since the version number was last recorded.

9. The method as recited in claim 7, wherein said predicting further comprises:
    storing, at the second thread, an object representing a state of the data object, wherein said representation is dependent on the state information;
    applying, to the object from the second thread, the one or more modification operations that have not yet been applied to the first version of the data object by the first thread.

10. The method as recited in claim 1, further comprising:
    recording a particular entry in the log from the second thread, wherein said recording comprises appending the particular entry to the log using an atomic compare and swap operation.

11. A system, comprising:
    a processor; and
    memory coupled to the processor, wherein the memory stores program instructions executable by the processor to implement a mechanism to coordinate concurrent accesses to data objects, wherein according to the mechanism:
    a first thread of a plurality of threads applies modification operations to a data object behalf of all other threads of the plurality of threads during a session in which the first thread owns a lock on the data object, wherein each of the modification operations corresponds to a respective entry recorded in a log by a respective thread of the plurality of threads;
    a second thread of the plurality of threads predicts a result of a particular operation requested by the second thread on the data object, wherein said predicting comprises using one or more entries in the log corresponding to one or more of the modification operations that have not yet been applied to the data object; and
    the second thread performs one or more other operations in a non-blocking manner during the session, wherein the one or more other operations are dependent on the predicted result of the particular operation.

12. The system as recited in claim 11, wherein the particular operation includes a read operation.

13. The system as recited in claim 11, wherein the particular operation includes a modification operation.

14. The system as recited in claim 11, wherein each entry recorded in the log corresponds to one or more operations of a method expressed in a programming language.

15. The system as recited in claim 11, wherein according to the mechanism,
    the first thread applies the one or more modification operations to a first version of the data object during the session; and
    wherein, to predict the result of the particular operation, the second thread reads a second version of the data object, wherein the second version is not modified during the session.

16. The system as recited in claim 15, wherein according to the mechanism,
    the first thread releases the lock on the data object to end the session;
    a different thread of the plurality of threads acquires the lock on the data object to initiate a new session; and
    the different thread applies a modification operation to the second version of the data object during the new session, wherein the first version of the data object is not modified during the new session.

17. A computer-readable storage medium, comprising program instructions, wherein the instructions are computer executable to implement a mechanism to coordinate concurrent accesses to data objects, wherein according to the mechanism:
    a first thread of a plurality of threads applies modification operations to a data object behalf of all other threads of the plurality of threads during a session in which the first thread owns a lock on the data object, wherein each of the modification operations corresponds to a respective entry recorded in a log by a respective thread of the plurality of threads;
    a second thread of the plurality of threads predicts a result of a particular operation requested by the second thread on the data object, wherein said predicting comprises using one or more entries in the log corresponding to one or more of the modification operations that have not yet been applied to the data object; and
    the second thread performs one or more other operations in a non-blocking manner during the session, wherein the one or more other operations are dependent on the predicted result of the particular operation.

18. The storage medium as recited in claim 17, wherein each entry recorded in the log corresponds to one or more operations of a method expressed in a programming language.

19. The storage medium as recited in claim 17, wherein according to the mechanism,
    the first thread applies the one or more modification operations to a first version of the data object during the session; and
    wherein, to predict the result of the particular operation, the second thread reads a second version of the data object, wherein the second version is not modified during the session.

20. The storage medium as recited in claim 19, wherein according to the mechanism,
    the first thread releases the lock on the data object to end the session;
    a different thread of the plurality of threads acquires the lock on the data object to initiate a new session; and
    the different thread applies a modification operation to the second version of the data object during the new session, wherein the first version of the data object is not modified during the new session.

* * * * *